O. E. BISHOP.
HYDRAULIC CLUTCH AND POWER TRANSMISSION DEVICE.
APPLICATION FILED JUNE 14, 1919.
1,358,054.
Patented Nov. 9, 1920.
5 SHEETS—SHEET 1.
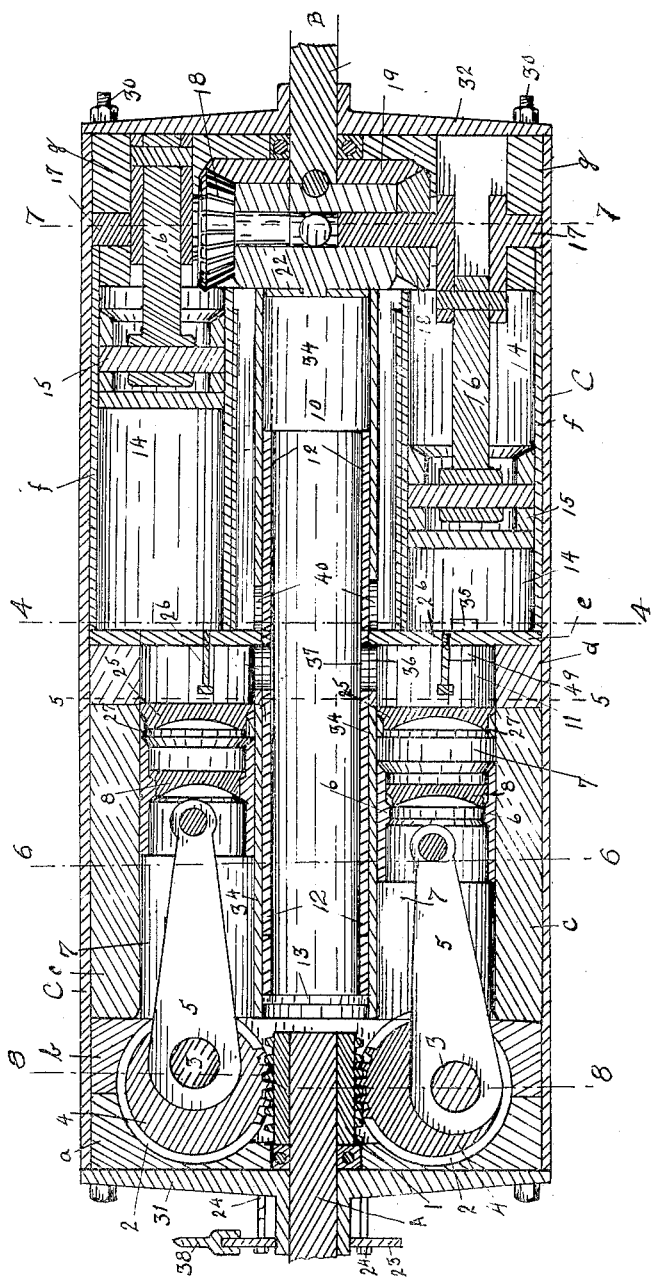
INVENTOR
BY
ATTORNEY

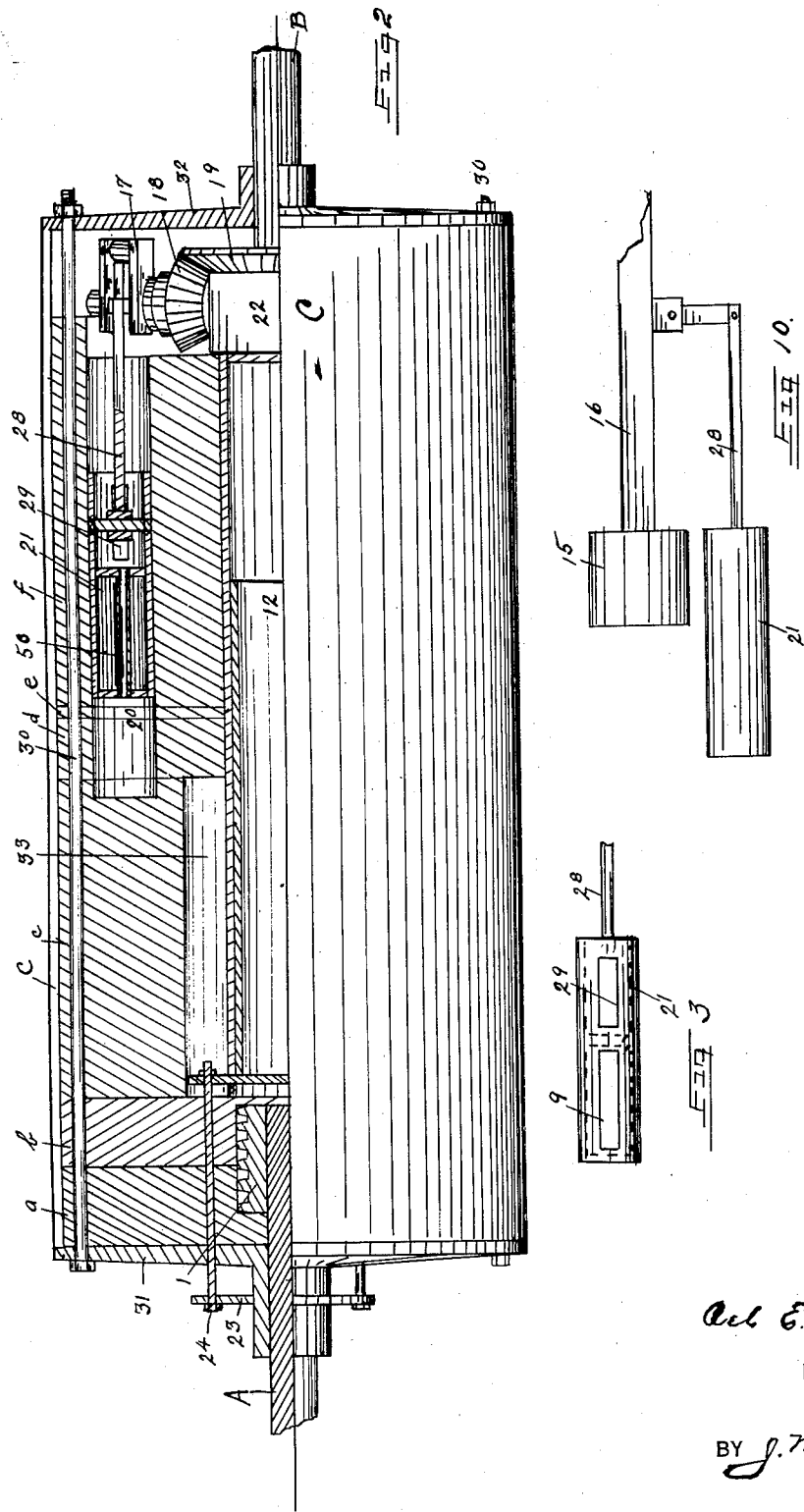

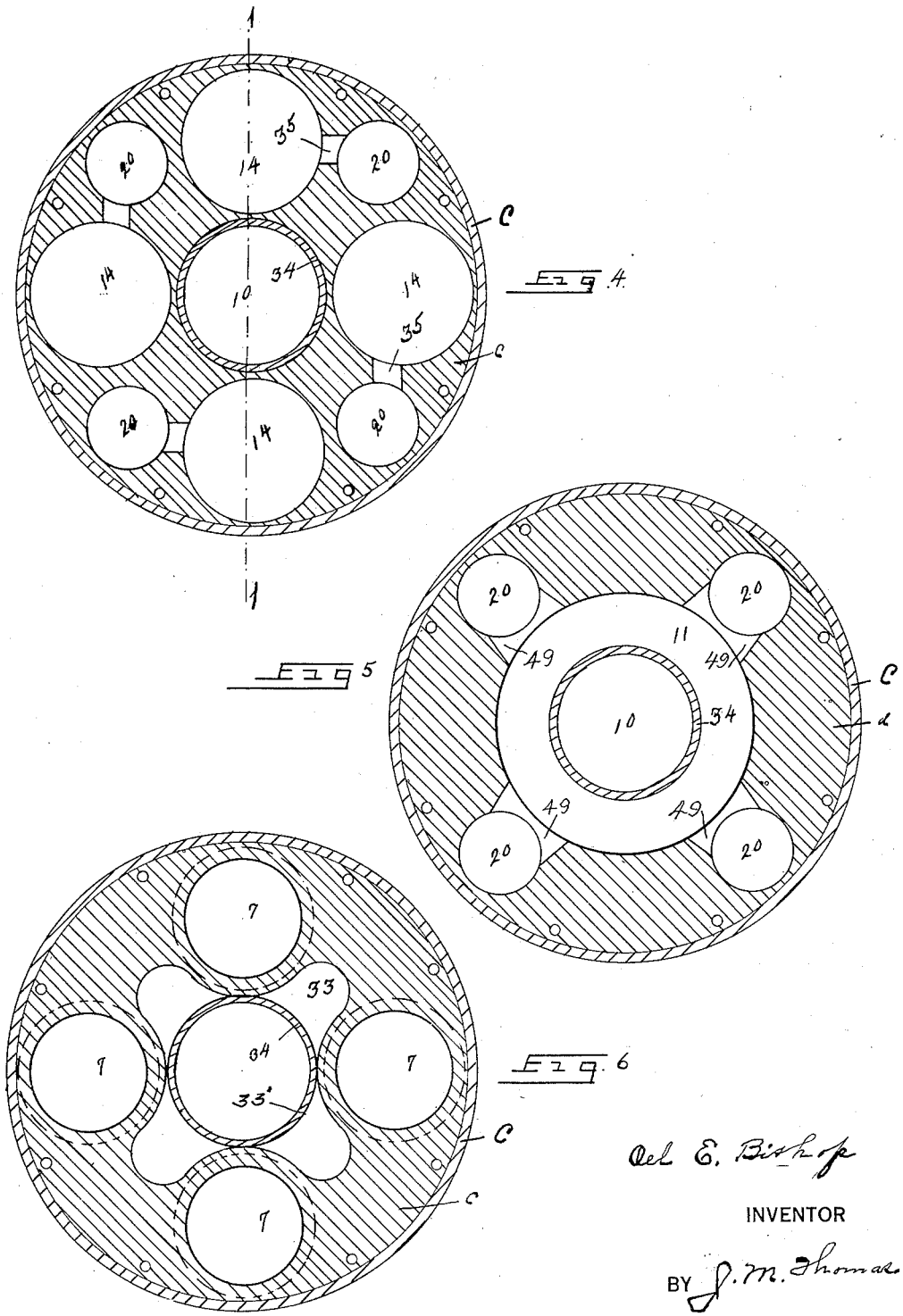

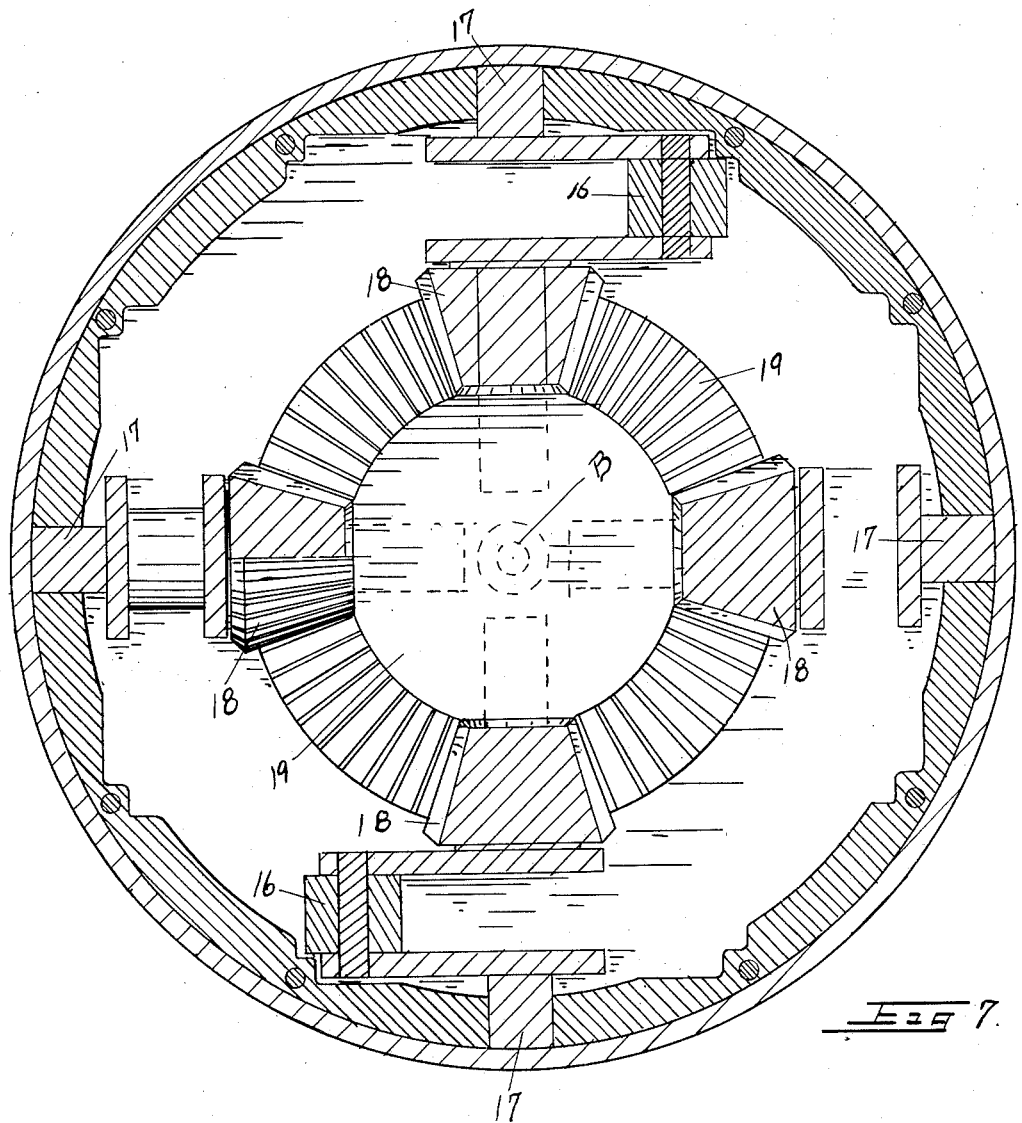

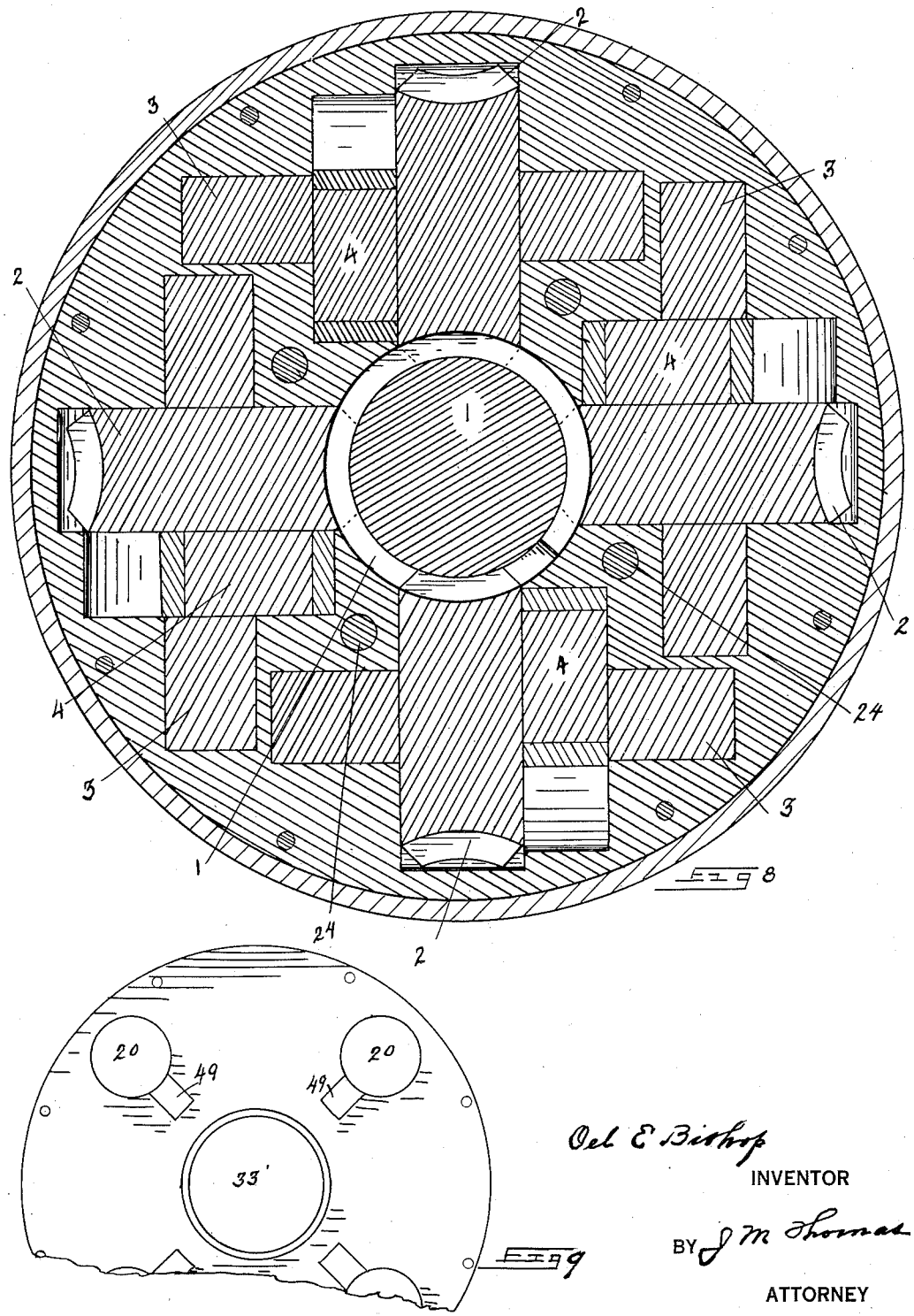

UNITED STATES PATENT OFFICE.

OEL E. BISHOP, OF GARFIELD, UTAH.

HYDRAULIC CLUTCH AND POWER-TRANSMISSION DEVICE.

1,358,054. Specification of Letters Patent. Patented Nov. 9, 1920.

Application filed June 14, 1919. Serial No. 304,340.

*To all whom it may concerns*

Be it known that I, OEL E. BISHOP, a citizen of the United States, residing at Garfield, in the county of Salt Lake and State of Utah, have invented certain new and useful Improvements in Hydraulic Clutch and Power-Transmission Devices, of which the following is a specification.

My invention relates to power transmission, and has for its object to provide a compact and efficient clutch mechanism by which power may be transmitted from a driving to a driven shaft, and the power transmitted with decreased speed and increased power. A further object is to provide a mechanism whereby the speed of a driving shaft may be imparted to a driven shaft with a hydraulic clutch and the speed reduced and power increased if it is so desired.

These objects I accomplish with the mechanism illustrated in the accompanying drawings in which similar letters and numerals of reference indicate like parts throughout the several figures and as described in the specification forming a part of this application and pointed out in the appended claims.

In the drawings in which I have shown a substantial embodiment of my invention, Figure 1 is a longitudinal section through the device, on line 1—1 of Fig. 4. Fig. 2 is another longitudinal section through the device on different diameter with parts shown in dotted lines to illustrate the different working positions and parts shown in elevation. Fig. 3 is an elevation of the sleeve throttle valve. Fig. 4 is a transverse section on line 4—4 of Fig. 1. Fig. 5 is a transverse section of the machine on line 5—5 of Fig. 1. Fig. 6 is a transverse section of the machine on line 6—6 of Fig. 1. Fig. 7 is a transverse section of the machine on line 7—7 of Fig. 1. Fig. 8 is another transverse section of the machine on line 8—8 of Fig. 1. Fig. 9 is a side elevation of the partition member. Fig. 10 is an elevation of the throttle valve and connecting rod with the connecting rod to which it is pivoted.

It is the special object of the invention to provide a compact and efficient clutch wherein hydraulics are used to transmit and increase the power of a rotating shaft to another rotatable driven shaft for use on road vehicles such as automobiles and trucks and thereby to do away with the transmission gears and shifting mechanism.

In the drawings I show the driving shaft as A and the alined driven shaft as B with the cylindrically shaped casing C covering the abutting ends of both shafts. A worm pinion 1 is secured on the end portion of said driving shaft A, and said pinion engages four worm gears 2, in each of which is secured shafts 3 that in turn are mounted in bearing blocks $a$ and $b$ which are carried on the interior of said casing C. On each of said shafts 3 is operatively carried an eccentric 4 which eccentrics are connected by the connecting rods 5 with the pistons 6. The said pistons 6 are each operated within its respective chamber 7 and are each provided with a centrally placed check valve 8. In constructing the different chambers, ports, conduits and other portions of my invention and to provide bearings, partitions and walls for said chambers I use blocks of metal similar to said blocks $a$ and $b$ above described and all of which blocks are held contiguous and in place within said casing C by the bolts 30 and nuts screwed thereon, which bolts are passed through the respective holes in the end plates 31 and 32 which form the closure for said casing C, and through the respective holes in said blocks. Contiguous said block $b$ and next in order is a block $c$ within which are bored the said chambers 7 and a central irregularly shaped recess 33 is formed as shown in Fig. 6, within which recess is operated the spider frame to which the throttle valve is fastened. A throttle valve casing 34 tubular in form is secured in a central bore in said block $c$, which bore is shown as 33′ in Fig. 6. Another block of metal $d$ is secured by the same bolts 30 contiguous said block $c$ within said casing C within which is centrally bored the chamber 11 which is in open connection with all of said chambers 7, and said tubular casing 34 passes centrally through said chamber 11 as shown in Fig. 5.

A partition member $e$ consisting of a sheet of metal is also held within said casing C by said bolts 30 between said block $d$ and another block $f$, and the said tubular member 34 and valve chambers pass through this partition member. The said partition member $e$ is the division between the chambers in one end of my machine and the chambers in the other end and the ports opening into the several chambers of one end of my machine pass the oil through this member *e* by way of the sleeve valve 21 through the ingress and egress ports of the chambers in the other end portion of my machine and back through the central tubular member 34. In the said block *f* are bored the four chambers 14, within which the driven pistons 15 are operated, and also a portion of the four valve chambers 20 within which the sleeve valves 21 are operated. The said four valve chambers 20 are bored through said partition member *e* and through the said block *d* and into the said block *c* but not through it, and the unbored portion of said block *c* forms the bottom of said chambers which are open at their other ends. Within still another block of metal shown at *g*, which is also held in said casing C by said bolts 30, contiguous said block *f*, is mounted one end of the four crank shafts 17, each of which has a bevel pinion 18 secured thereon. The inner end portions of said crank shafts 17 are journaled in a bearing block 22 which in turn is secured rigidly to said block *f*. The teeth of all of said bevel pinions 18 mesh with the teeth of a bevel gear 19 which in turn is secured on the end of said driven shaft B.

The said throttle valve 12 is fastened to a spider member 13 which is connected with a collar 23 that is carried on said driving shaft A by the bolts 24. Set screws 26 screwed in said partition member *e* regulate the lift of the check valves 25 which are operated within said chambers 7, and sleeve bushings 27, which are secured to the inner wall of said chambers 7, are cut to form seats for said valves 25. Each of said sleeve valves 21 is operated in its respective chamber 20 by means of a connecting rod 28 which is pivoted to an arm integral with and rigidly secured to the said connecting rod 16 that in position and in operation is ninety degrees ahead of the driven piston whose ports coact therewith. The said valves 21 are moved within their respective chambers and open and close the ports thereof in unison with the driven pistons 15 which are operatively connected therewith. Each of said sleeve valves 21 has two ports in its wall and which are spaced apart a distance equal to the thickness of the chamber 11. A partition plug separates the interior of said sleeve valve 21 between said ports, one of which ports shown at 9 is much wider than the other, which is shown at 29. Conduits 35 are cut in the side face of said block *f* connecting each of said chambers 14 with its coacting valve chamber 20. A pipe 50 connects the interior of said valve 21 back of the partition plug to its open chamber to prevent vacuums.

The operation of my machine is as follows:—

With light oil supplied to fill the interior of said casing C and its chambers and with power applied to rotate said driving shaft A the worm pinion 1 will rotate said gears 2 and reciprocate said pistons 6 through the rods 5 and eccentrics 3. The said eccentrics are so positioned or set that each is ninety degrees behind the preceding one, and as each of said pistons 6 is forced away from said head 31 the central check valve 8 will be closed or seated and the check valve 25 opened and oil will flow or be forced out of the chamber 7 into and out of chamber 11 through port 36 in tubular casing 34 and port 37 in throttle valve 12 to the interior chamber 10 of said valve, and in neutral position as to said valve and no power will be transmitted. When the throttle valve 12 is moved by the lever 38 toward the end piece 32 far enough to partially open port 37 to port 40 in the tubular casing 34 oil will flow from chamber 11 to chamber 10, and also some of it through ports 36, 37 and 40 which are so positioned in relation to each other that ports 36 and 40 may both be partially opened and in communication with port 37 at the same time to prevent sudden starting of the machine and when the oil valve 12 is moved onward until port 36 is closed the oil will flow through port 49 to valve 21 and through port 9 of said valve and the conduit 35 of the piston chamber 14, and it will impart motion to the piston 15 and through the connecting rod 16 to the crank shaft 17 which will rotate pinion 18 and thereby the bevel gear 19 and shaft B. On the last quarter of the movement of each of the pistons 15 the valve 21 which in coöperation is 90 degrees ahead of it will change its direction of travel, and just before any of the pistons 15 completes its stroke the port 29 of the coacting valve 21 will open. The ports, conduits, or passages 35 and 49 are radial passages cut between and connecting the respective chambers 11 and 20, and 14 and 20, and are cut in the faces of the blocks *d* and *f*, and are shown in Figs. 4 and 5 respectively.

The flow of oil will be out of the end of said chamber 14 to the interior of said throttle valve or chamber 10, and to the extent that oil is forced through said valve port 37 to move said piston 15 power will be transmitted to the shaft B. When said port 37 is fully open to port 40 all of the power of the oil set in motion by the piston 8 will be imparted to said shaft B and if the rotation of said shaft B is utilized in driving an automobile or other road vehicle the vehicle will be given low speed. The flow of oil from the driving side of said piston 15 will pass out of the chamber 14, when said piston has been given its full driving motion, through the conduit 35 into the sleeve valve 21 and through port 29. When said piston is moved on its return stroke by the action of the bevel gears and crank shafts 17, the valve 21 will by reason of its being set 90 degrees ahead of said piston be moved so that its port 29 will be in communication with conduit 35 when otherwise there would be compression in the head of chamber 14, and the oil that otherwise would be in a pocket will flow freely to the rear of piston 15 and back through port 40 into chamber 10. As there are four driving pistons 8, four driven pistons 15 and four sleeve valves, each set positioned and acting as described above for the one set, it will be obvious that continuous action will take place and when desired all of the power of the driving shaft A will be imparted to the shaft B with less speed and consequent increased power. To impart the same speed to shaft B that is given shaft A, the throttle valve 12 is moved toward the end piece 32 far enough to close port 40 which will trap all flow of oil in all of said chambers, and power will be transmitted directly from the driving shaft A to the driven shaft B. With port 36 and port 40 partially opened as desired, any intermediate speed may be imparted.

Having thus described my invention and its operation I desire to secure by Letters Patent and claim:—

1. In a clutch and power transmission machine the combination with a driving shaft; of a worm pinion thereon; worm gears in mesh therewith; eccentrics moved by said gears; pistons connected with said eccentrics and operable in oil chambers; valves in said pistons and chambers to control the flow of oil; a larger oil chamber in communication with all of said chambers; a central oil chamber having ports in its walls; a throttle valve operable in said central chamber having a port in its wall adapted to be brought into and out of communication with the ports in said large oil chamber; a partition member forming a closure for the first mentioned chambers; other oil chambers 14 positioned around said central oil chamber; sleeve valves adapted to be brought into communication with said large chamber and chambers 14; pistons operable in chambers 14; crank shafts connected therewith; a driven shaft; and bevel gears to connect said crank shafts with said driven shaft.

2. In a machine of the class described the combination with a driven shaft of a worm pinion thereon; worm gears in mesh therewith; eccentrics moved by said gears; pistons connected with said eccentrics and operable in oil chambers; other oil chambers practically in alinement with said first mentioned oil chambers; pistons operable in said last mentioned chambers; crank shafts connected therewith; a driven shaft; bevel gears to connect said crank shafts with said driven shaft and means to impart the motion of the first mentioned pistons to said second mentioned pistons.

In testimony whereof I have affixed my signature.

OEL E. BISHOP.